(No Model.)
J. F. KEIPER.
SEPARATOR.
No. 463,514. Patented Nov. 17, 1891.
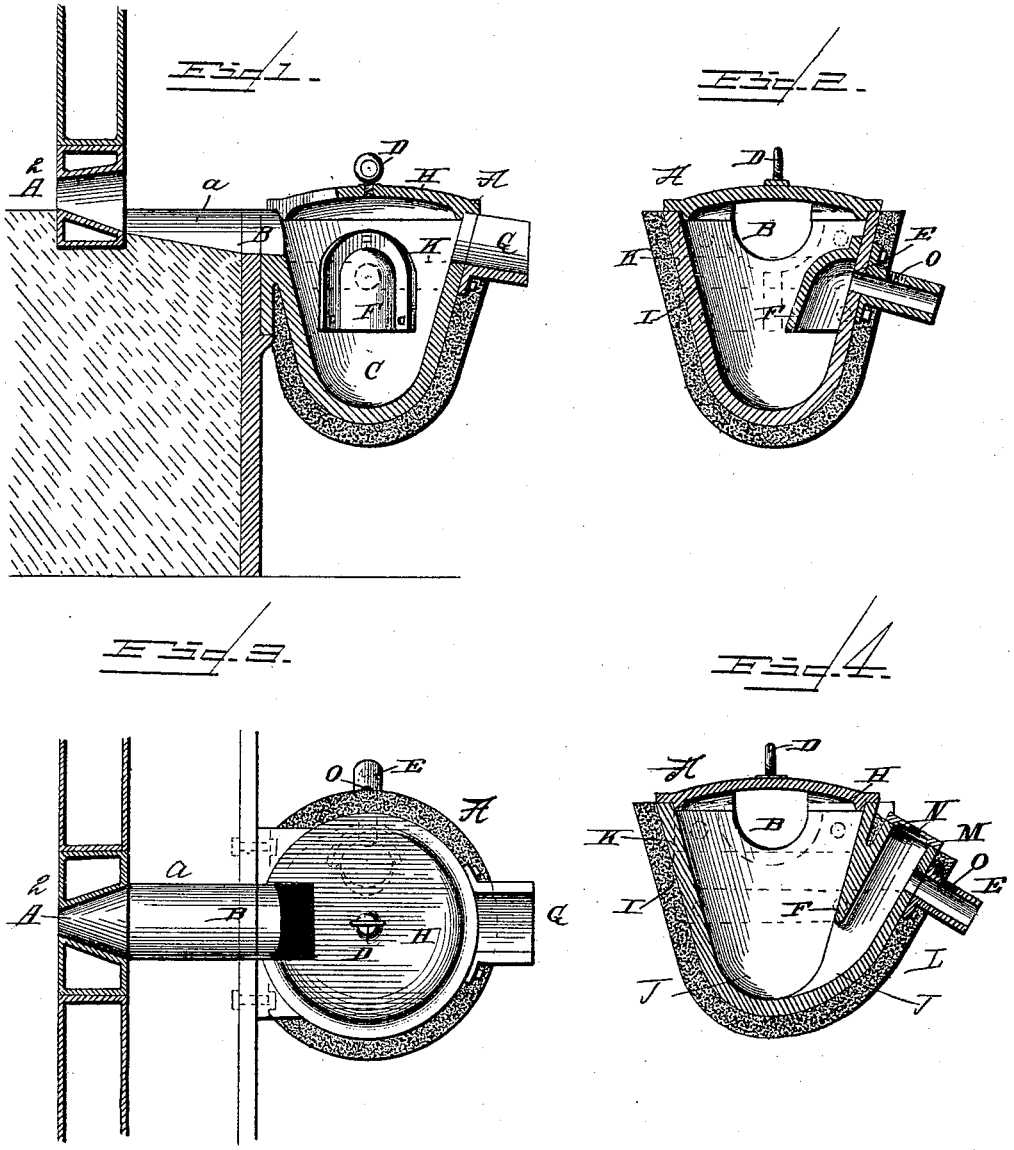
Witnesses,
David H. Mead.
F. B. Keefer.
John F. Keiper
Inventor,
by
R. S. Dyrenforth,
his Attorney.

UNITED STATES PATENT OFFICE.

JOHN F. KEIPER, OF DENVER, COLORADO.

SEPARATOR.

SPECIFICATION forming part of Letters Patent No. 463,514, dated November 17, 1891.

Application filed March 26, 1889. Serial No. 304,886. (No model.)

*To all whom it may concern:*

Be it known that I, JOHN F. KEIPER, a citizen of the United States, residing at Denver, in the county of Arapahoe and State of Colorado, have invented certain new and useful Improvements in Apparatus for Separating Slag from Lead; and I do hereby declare the following to be a full, clear, and exact description of the invention, such as will enable others skilled in the art to which it appertains to make and use the same.

This invention relates to apparatus for separating slag from lead.

The object of the invention is to produce a cheap and effective device for separating the products of a lead-furnace, and particularly for the separation of lead containing silver or gold from slag or matte.

With these objects in view the invention resides, essentially, in a separator comprising a vessel provided with a lead-outlet and a slag or matte outlet, and an apron, curtain, or dividing-wall depending into the vessel in such manner as to separate the slag and matte and the heavier portions of the lead.

The invention resides, furthermore, in various novel details of construction whereby the objects of the invention are attained.

I have illustrated the invention in the accompanying drawings, in which—

Figure 1 is a sectional view of a separator made in accordance with my invention, showing it connected with the tap-hole of a furnace. Fig. 2 is a sectional view, the section being taken on a line at right angles to that upon which the section of Fig. 1 is taken. Fig. 3 is a plan view of the separator, and Fig. 4 is a sectional view of a modified form of separator.

In the drawings, A represents a vessel of suitable size and shape connected by a pipe or conduit $a$ with a tap-hole of a furnace $A^2$. The vessel A may be located near the furnace or attached thereto, as desired. The vessel A is provided at its side with a discharge-spout E, having an air hole or outlet at O, said spout being located a short distance below the top of the vessel, and through which the molten lead is discharged into molds or the like. The vessel is provided with a second discharge-spout G, arranged a short distance higher up in the wall of the vessel than the spout E, and is designed to carry away the slag and matte.

H represents a cover provided with an eye or handle D, by which it may be lifted from the separator when it is desired to have access to the interior of the vessel.

F represents a curtain or apron attached to the side of the vessel and extending down from the inner end of the lead-spout. This curtain extends a sufficient distance down into the vessel to reach a point which in the operation of the separator will be entirely occupied by the heavy molten lead, in order to allow only the lead to pass up to the discharge-spout designed to convey it, and forms a conduit or passage at the side of the vessel from the bottom thereof to the discharge-spout, and prevents the approach of the lighter slag and matte, which will rise naturally to the top. The slag and matte, being prevented from passing from the separator with the lead, will naturally rise in the separator and discharge through the spout G, designed to permit its escape.

The entire vessel is surrounded by a non-conducting coating or envelope of any suitable material, such as asbestus, for the purpose of preventing radiation of heat, and serving to retain the contents of the vessel in a molten state.

Ordinarily the apron is attached to the inner face of the vessel by bolts or the like; but, if desired, the vessel may be constructed as shown in Fig. 4 of the drawings. In this figure is represented a separator in which the vessel has cast integral with it a discharge-pipe L, extending from a point near the bottom of the vessel to a convenient point of discharge, and is provided at its upper end with a cover or cap M, in which an air-hole N is formed. The dividing-wall $F^2$ in this structure is a substitute for and serves the same purpose as the attached curtain shown in the other figures of the drawings. The discharge-spout E may be cast integral with the pipe L or made detachable and fastened thereto in any suitable manner. The dotted lines of this figure represent the relative positions assumed by the different component parts of the ore.

K indicates the slag, I the matte, and J the lead.

Having thus fully described my invention, what I claim as new, and desire to secure by Letters Patent, is—

A separator consisting of the vessel provided with the lead-discharge spout having an air-opening in its upper side, the slag-discharge opening at about right angles to the lead-discharge spout, and the curtain or apron arranged over the inner end of the lead-discharge spout, substantially as described.

In testimony whereof I affix my signature in presence of two witnesses.

JOHN F. KEIPER.

Witnesses:
WILLIAM D. McGOWAN,
JAMES W. McGOWAN.